March 1, 1960     A. H. FAULKNER     2,927,254

IMPULSE GENERATOR WITH IMPULSE RELAY

Filed Oct. 4, 1955

*INVENTOR.*
ALFRED H. FAULKNER
BY

ATTY.

United States Patent Office 2,927,254
Patented Mar. 1, 1960

2,927,254

IMPULSE GENERATOR WITH IMPULSE RELAY

Alfred H. Faulkner, Chicago, Ill., assignor to General Telephone Laboratories, Incorporated, a corporation of Delaware Application October 4, 1955, Serial No. 538,426

2 Claims. (Cl. 317—142)

This invention relates in general to a pulse generator and more specifically to a device for generating a series of timed pulses of uniform duration and interval.

In the present embodiment I have shown a circuit which will automatically trigger the sequence and start the pulsing cycle upon the application of a D.C. supply. The cyling will then continue until the D.C. supply is removed. The frequency of the pulses may be varied by adjusting the resistance of a variable resistor. Through the use of components with the proper constants, pulse frequencies ranging from about ten to several hundred pulses per second can be attained.

The main element of the circuit is a cold cathode gas-filled triode. It is well-known that this type of tube requires a positive bias on the grid with respect to the cathode to cause the tube to fire. When the tube has fired and is in the conducting stage, the grid loses control over the action of tube. The usual method of extinguishing the tube thereafter, is to open the plate or cathode circuit. This may be accomplished by a variety of methods.

It is the purpose of this invention to provide a simple circuit which requires only one capacitor which not only activates but also deactivates the pulsing circuit. First, a positive grid bias is placed on the triode when the capacitor has sufficiently charged. This bias triggers the tube into operation and the tube conducts. With the operation of the circuit a positive potential is instantaneously placed on the cathode by the same capacitor, extinguishing the tube after the capacitor is caused to be discharged. This circuit is then ready to start another pulse when the capacitor has re-charged to the tube conduction level. In this manner, with a minimum of circuit elements, a steady series of pulses can be transmitted.

The features as well as other objects of the invention may be more readily understood when viewed with regard to the drawings and the following specification.

Figure 1:
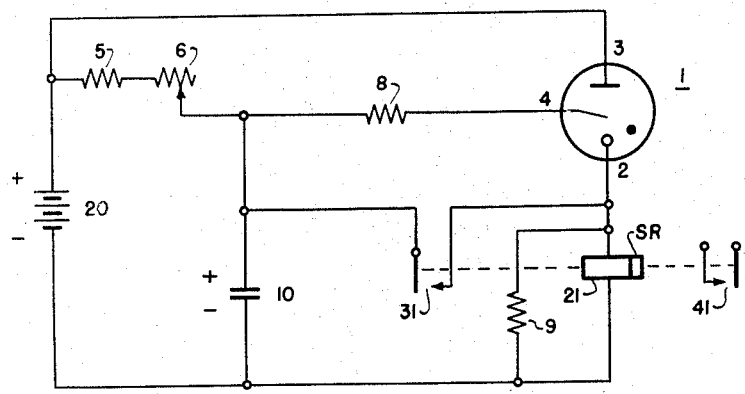
Figure 2:
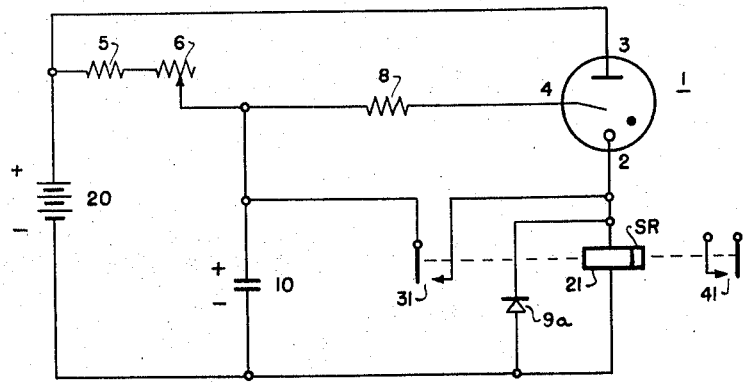

Fig. 1 shows the preferred embodiment of the invention. Fig. 2 shows an alternate method for shunting the pulsing relay of the circuit.

In Fig. 1 is shown a direct current source 20 of at least 115 volts. Directly across the source is placed a resistance-capacitance time delay circuit consisting of fixed resistor 5, variable resistor 6 and capacitor 10. The use of R-C circuits for timing in general is well-known and the use of a variable resistor to vary the time cycle is also generally known. In order to permit the wide range of time delays previously mentioned, the maximum resistance of resistor 6 and the capacitance of condenser 10 must be such the this range can be attained.

Also connected across the line is the tube operating circuit which consists of the path from the positive side of the direct current source 20 to the plate 3, cathode 2 of gas-filled tube 1, through the winding of slow to release relay 21 to the negative side of the source. Shunted across relay 21 is resistor 9 whose purpose in the circuit is to reduce the inductive surge set up in relay 21 on its release. Grid 4 of tube 1 is connected to the positive plate of capacitor 10 through resistor 8.

Relay contact springs 31 of relay 21, shown as normally open, connect the positive plate of condenser 10 to cathode 2 when closed. Contact springs 41 are used to transmit the generated pulses to an external circuit. Spring 41 are shown as a single pair of normally open springs but neither of these conditions need prevail. If more external impulse receivers are used, additional spring combinations could be added to springs 41. If the percent make of the pulse should require a change, then normally closed springs could readily be used.

Fig. 2 shows an inversely biased crystal diode 9a in place of resistor 9 of Fig. 1. The purpose of the diode is to provide a high resistance to normal currents and a low resistance to the inductive surges from relay 21 so as to dissipate them.

The operation of the circuit of Fig. 1 is as follows: when the current from the D.C. source 20 is applied to the circuit, a charge is built upon the positive plate of capacitor 10. This charge is impressed on the grid 4 of the triode tube 1 through resistance 8.

When the grid bias reaches the level of conduction of the tube, the tube 1 will fire and conduct. Upon firing, the tube completes an operating path through the winding of relay 21. On operating, relay 21 operates it contacts 31 to connect the positive plate of condenser 10 to the cathode 2 of the tube. Relay 21 also closes its contacts 41 to signify the start of the pulse to the external circuit.

The build up of a positive charge from the condenser on the cathode of the tube causes extinguishing of the tube. The tube then stops conducting and opens the operating path to the relay 21. The values of resistors 5 and 6 are large enough so that the relay 21 is not held operated over the path through resistors 5 and 6, contacts 31 and relay coil 21. Relay 21 is of the slow to release type and remains operated after the tube ceases conduction. Condenser 10 discharges through windings of the relay coil. After a time delay, the slow to release relay 21 releases. Contacts 31 open. Contacts 41 open upon release of relay 21, signalling the end of the pulse to the external circuit. The circuit is then in position to repeat the cycle since all circuit elements have restored to the original condition. The cycle will then automatically repeat until the current supply is removed.

What is claimed is:

1. An electrical impulse generating circuit comprising a gas-filled triode tube having a cathode, plate and grid, a plate circuit extending from said plate to said cathode, including a slow-acting relay and a source of direct current in series, a single capacitor in the generating circuit connected to said grid, means for applying said source to said capacitor to charge the same in a positive manner to apply a positive potential to bias said grid to cause said tube to conduct and operate said slow-acting relay, contacts on said relay operated to close a discharge path for the capacitor and connect said capacitor to discharge said capacitor positive potential on to said cathode to cause said tube to cease conduction and thereby disable the operating path to said relay, said slow-acting relay releasing upon expiration of a time delay after the cessation of conduction of the tube by said capacitor, other contacts on said relay controlled by the operation and release of the relay to control an external circuit.

2. An electrical impulse generating circuit comprising a gas-filled triode tube having a cathode, plate and grid, a source of direct current including circuit connections to said cathode and said plate, a capacitor, means for applying the current from said source to charge said capacitor in positive manner, said capacitor connected to the grid of said tube to bias said tube to conduction on the charging of said capacitor, a relay connected between the cathode of said tube and said direct current source, said relay energizable on conduction of said tube, a first set of contacts on said relay responsive to energization of said relay to control an external circuit, and a second set of contacts on said relay responsive to energization of said relay to discharge said capacitor positive charge onto the cathode of said tube to immediately cause said tube to cease conduction, said relay deenergized on cessation of conduction of said tube to thereupon cause said first set of contacts to terminate the control of the external circuit, said second set of contacts on deenergization of said relay restoring said capacitor positive charge to bias the grid of said tube to start another signal cycle.

References Cited in the file of this patent

UNITED STATES PATENTS

| | | |
|---|---|---|
| 1,966,077 | Nyman | July 10, 1934 |
| 2,279,007 | Mortley | Apr. 7, 1942 |
| 2,567,928 | Farmer | Sept. 18, 1951 |
| 2,761,967 | Rockafellow | Sept. 4, 1956 |

FOREIGN PATENTS

| | | |
|---|---|---|
| 260,291 | Great Britain | Sept. 8, 1927 |

OTHER REFERENCES

Abstract Ser. No. 598,171, published Dec. 20, 1949.